(12) United States Patent
Edamitsu et al.

(10) Patent No.: US 10,677,982 B2
(45) Date of Patent: Jun. 9, 2020

(54) PLANAR ILLUMINATION DEVICE

(71) Applicant: MINEBEA MITSUMI Inc., Nagano (JP)

(72) Inventors: Takashi Edamitsu, Fukuroi (JP); Hideyuki Tokunaga, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 68 days.

(21) Appl. No.: 15/695,328

(22) Filed: Sep. 5, 2017

(65) Prior Publication Data

US 2018/0067252 A1 Mar. 8, 2018

(30) Foreign Application Priority Data

Sep. 8, 2016 (JP) .................................. 2016-175926

(51) Int. Cl.
  F21V 7/04 (2006.01)
  F21V 8/00 (2006.01)
  G02F 1/13357 (2006.01)
(52) U.S. Cl.
  CPC .......... *G02B 6/0088* (2013.01); *G02B 6/005* (2013.01); *G02B 6/0046* (2013.01); *G02B 6/0053* (2013.01); *G02B 6/0055* (2013.01); *G02B 6/0068* (2013.01); *G02B 6/0093* (2013.01); *G02F 1/133603* (2013.01); *G02F 1/133605* (2013.01)
(58) Field of Classification Search
  CPC .. G02B 6/0088; G02B 6/0051; G02B 6/0053; G02B 6/0055; G02B 6/0083
  See application file for complete search history.

(56) References Cited

U.S. PATENT DOCUMENTS

| 8,235,572 | B2* | 8/2012 | Hsu ................... G02F 1/133615 349/58 |
| 8,834,005 | B2* | 9/2014 | Kim ....................... G02B 6/009 349/58 |
| 9,194,999 | B2* | 11/2015 | Horiuchi ............. G02B 6/0091 |
| 2005/0099554 | A1 | 5/2005 | Hayano |
| 2007/0115403 | A1* | 5/2007 | Chen .................... G02B 6/0038 349/65 |
| 2008/0291356 | A1* | 11/2008 | Kim ..................... G02B 6/0088 349/58 |

(Continued)

FOREIGN PATENT DOCUMENTS

| CN | 1598664 A | 3/2005 |
| CN | 101201488 A | 6/2008 |

(Continued)

OTHER PUBLICATIONS

Japanese Office Action dated Sep. 4, 2018 for corresponding Japanese Application No. 2016-175926 and English translation.

(Continued)

*Primary Examiner* — Matthew J. Peerce
(74) *Attorney, Agent, or Firm* — Pearne & Gordon LLP

(57) ABSTRACT

A planar illumination device according to an embodiment includes: a light guide plate that guides an incident light from a side surface; a light source that is disposed in the side surface side and emits light incident to the side surface; a frame that has a floor surface extending along a main surface of the light guide plate and accommodates the light guide plate and the light source; a reflection sheet that is disposed in the main surface side of the light guide plate and reflects light; and a first fixing member that is disposed between the reflection sheet and the floor surface and fixes at least a part of an end portion of the reflection sheet in the light source side to the floor surface.

15 Claims, 5 Drawing Sheets

(56) References Cited

U.S. PATENT DOCUMENTS

| | | |
|---|---|---|
| 2011/0007520 A1 | 1/2011 | Shigeta et al. |
| 2012/0250352 A1* | 10/2012 | Hirasawa .............. G02B 6/0085 362/611 |
| 2015/0036385 A1 | 2/2015 | Kawai |
| 2016/0252777 A1 | 9/2016 | Toyooka |
| 2016/0291389 A1 | 10/2016 | Matsumoto et al. |
| 2017/0235039 A1* | 8/2017 | Kaneshiro ............ G02B 6/0031 362/609 |
| 2017/0359867 A1 | 12/2017 | Yuki et al. |
| 2018/0067252 A1 | 3/2018 | Edamitsu et al. |
| 2018/0259701 A1 | 9/2018 | Yuki et al. |

FOREIGN PATENT DOCUMENTS

| | | |
|---|---|---|
| CN | 201344422 Y | 11/2009 |
| CN | 101796344 A | 8/2010 |
| CN | 105629573 A | 6/2016 |
| CN | 105683825 A | 6/2016 |
| CN | 105705986 A | 6/2016 |
| CN | 207145998 U | 3/2018 |
| EP | 1 517 171 A | 3/2005 |
| JP | 2014-011026 A | 1/2014 |
| JP | 2015-032366 A | 2/2015 |
| JP | 2015-176752 A | 10/2015 |
| WO | 2015/066017 A1 | 5/2015 |
| WO | 2016/104360 A1 | 6/2016 |
| WO | 2016/104363 A1 | 6/2016 |

OTHER PUBLICATIONS

Chinese Office Action dated May 5, 2019 for corresponding Chinese Application No. 201710761962.2.

* cited by examiner

PLANAR ILLUMINATION DEVICE

CROSS-REFERENCE TO RELATED APPLICATION(S)

The present application claims priority to and incorporates by reference the entire contents of Japanese Patent Application No. 2016-175926 filed in Japan on Sep. 8, 2016.

BACKGROUND OF THE INVENTION

1. Field of the Invention

The present invention relates to a planar illumination device.

2. Description of the Related Art

A planar illumination device is used such that light emitting diodes (LEDs) are arranged in a manner facing a light incident surface of a light guide plate. This kind of planar illumination device has a reflection sheet disposed on a surface opposite to a light-emitting surface from which light of the light guide plate is emitted. The reflection sheet reflects light overflowing from the opposite surface and returns the light to the light guide plate. The reflection sheet is positioned, for example, with all the sides fixed to the frame or the light guide plate (for example, see Japanese Laid-open Patent Publication No. 2014-011026). An optical sheet disposed in the light-emitting surface side of the light guide plate is positioned by being fixed to another member; however, there is another type of illumination device that has an optical sheet fixed with only one of the sides (more specifically, a side perpendicular to a side corresponding to a light incident surface of the light guide plate) so as to prevent wrinkles from being generated due to heat or the like (for example, see Japanese Laid-open Patent Publication No. 2015-176752).

If all the sides of the reflection sheet disposed on the opposite surface of the light guide plate are fixed, wrinkles can be caused on the reflection sheet due to shrink and stretch of the reflection sheet with changes in temperature and humidity. Such wrinkles on the reflection sheet can cause non-uniform brightness on the light-emitting surface of the light guide plate because the directions of light reflected on different positions on the reflection sheet are changed. The non-uniform brightness may deteriorate brightness distribution on the light-emitting surface, and measures are therefore needed in obtaining more accurate and stable illumination. For dealing with today's requirement for what is called frame-size reduction, stabilizing the brightness distribution around the frame has been particularly needed.

SUMMARY OF THE INVENTION

A planar illumination device according to one embodiment of the present invention includes a light guide plate that guides an incident light from a side surface, a light source that is disposed in the side surface side and emits light incident to the side surface, a frame that has a floor surface extending along a main surface of the light guide plate and accommodates the light guide plate and the light source, a reflection sheet that is disposed in the main surface side of the light guide plate and reflects light, and a first fixing member that is disposed between the reflection sheet and the floor surface and fixes at least a part of an end portion of the reflection sheet in the light source side to the floor surface.

DETAILED DESCRIPTION OF THE PREFERRED EMBODIMENTS

Figure 1:
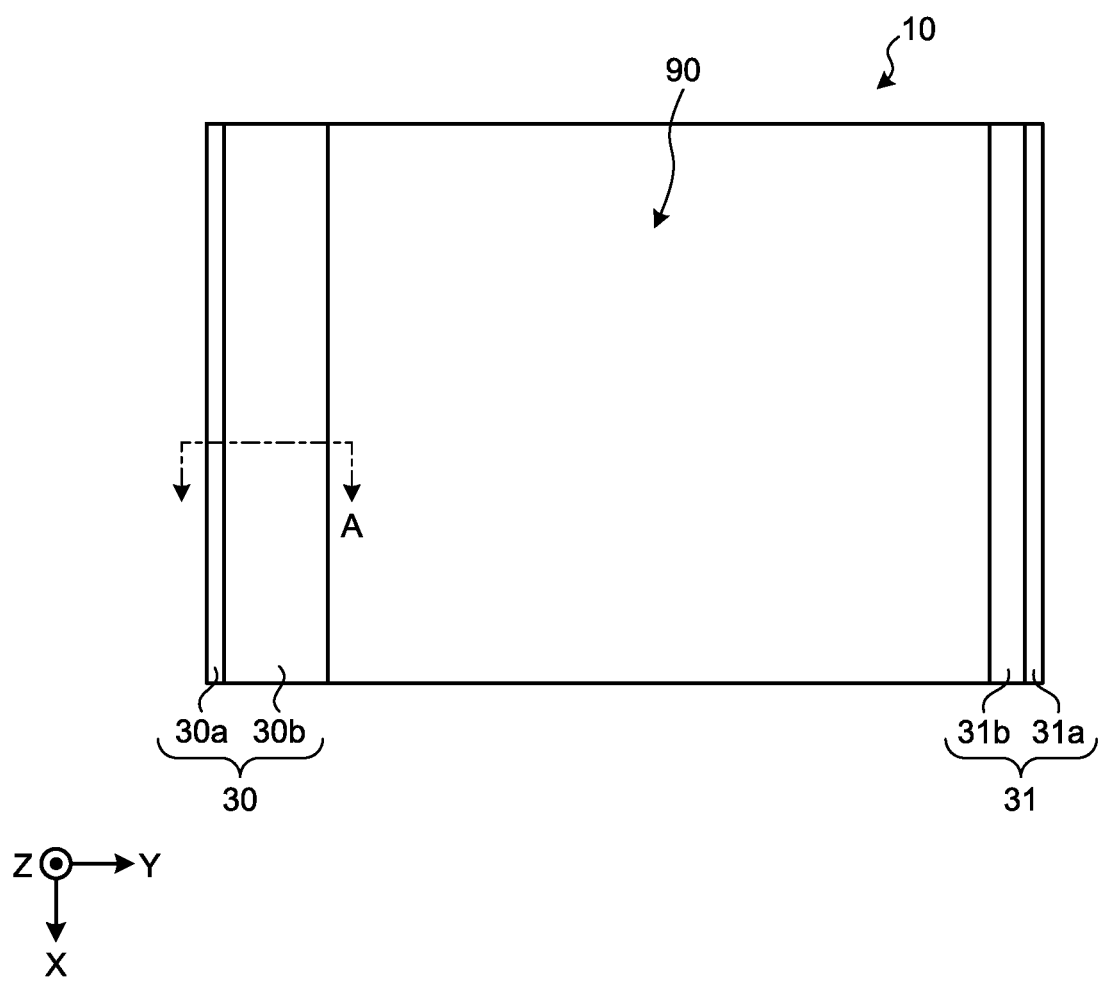
FIG. 1 is a front view of an exemplary appearance of a planar illumination device according to an embodiment.

A planar illumination device according to an embodiment will now be described with reference to the drawings. The relative size of a component, the ratio between components, and the like illustrated in the drawings may be different from those of the actual components. Furthermore, the relative size and the ratio between components are not necessarily shared between the drawings.

Embodiment

FIG. 1 is a front view of an exemplary appearance of a planar illumination device according to an embodiment. As illustrated in the example of FIG. 1, a planar illumination device 10 according to the embodiment is substantially rectangular in the top view. An end of the planar illumination device 10 in the longitudinal direction (the Y axis direction) is covered with a light shielding sheet 30 including a first light shielding sheet 30a and a second light shielding sheet 30b. The other side of the planar illumination device 10 in the longitudinal direction is covered with a light shielding sheet 31 including a third light shielding sheet 31a and a fourth light shielding sheet 31b. The planar illumination device 10 emits light from a luminescent area (sometimes referred to as an effective area) 90 not covered with the light shielding sheet 30 or the light shielding sheet 31. In other words, the light shielding sheet 30 and the light shielding sheet 31 define the luminescent area 90. The planar illumination device 10 according to the embodiment is used as a backlight of a liquid crystal display device, and the liquid crystal display device is used for, for example, a smartphone.

In FIG. 1, the light shielding sheet 30 has a larger width than the light shielding sheet 31 does. The light shielding sheet 30 has a larger width so as to cover a comparatively larger area including LEDs 14, a flexible printed circuit (FPC) 12, which will be described later, and the like in addition to a light guide plate 16, a diffusion sheet 18, and a prism sheet 19, which will be described later, disposed under the light shielding sheet 30, whereas the light shielding sheet 31 covers the light guide plate 16, the diffusion sheet 18, and the prism sheet 19, which will be described later, disposed under the light shielding sheet 31.

Figure 2:
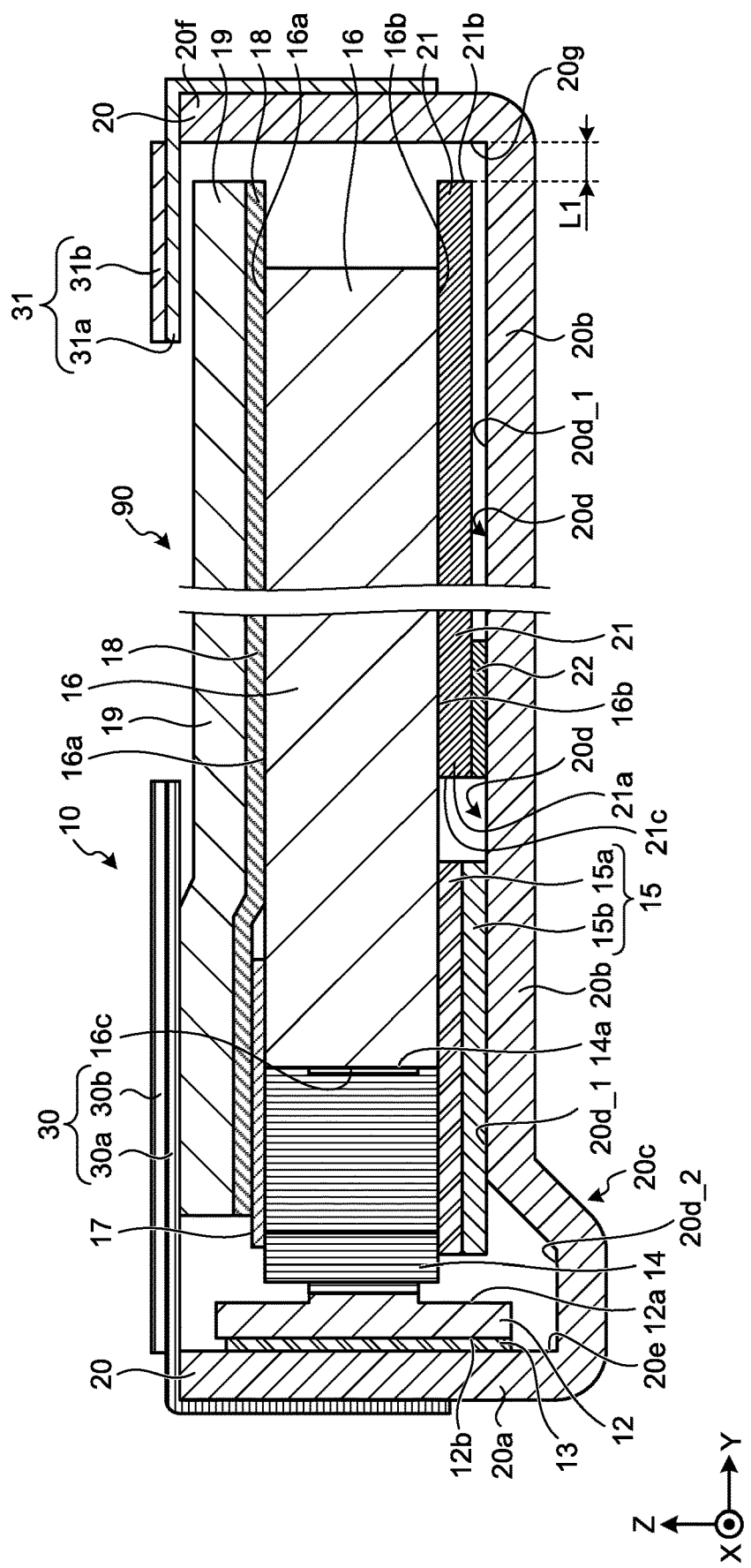
FIG. 2 is a cross-sectional view taken from the A-A line of FIG. 1.

FIG. 2 is a cross-sectional view taken from the A-A line of FIG. 1. As illustrated in FIG. 2, the planar illumination device 10 includes the FPC 12, a second fixing member 13, LEDs 14, a first connection member 15, the light guide plate 16, a second connection member 17, the diffusion sheet 18, the prism sheet 19, a frame 20, a reflection sheet 21, a first fixing member 22, the light shielding sheet 30, and the light shielding sheet 31.

The frame 20 accommodates therein the FPC 12, the second fixing member 13, the LEDs 14, the first connection member 15, the light guide plate 16, the second connection member 17, the diffusion sheet 18, the prism sheet 19, the reflection sheet 21, and the first fixing member 22. The frame 20 has side walls 20a and 20f and a bottom 20b. The frame 20 is, for example, a frame made of a stainless plate having large rigidity and reflectance.

The bottom 20b is in a shape extending along a main surface (an opposite surface) 16b, which will be described later, of the light guide plate 16. The bottom 20b further has a floor surface 20d as a surface in the light guide plate 16 side. The floor surface 20d is a surface extending along the opposite surface 16b. The floor surface 20d has a plane surface 20d_1 and a concave surface 20d_2, which will be described later. The plane surface 20d_1 has the LEDs 14, the light guide plate 16, and the reflection sheet 21 disposed thereon. A side wall 20a is integrally configured from an end of the bottom 20b in the Y axis minus direction in the direction in which light is emitted (in the normal direction of the plane surface 20d_1 of the floor surface 20d, which is the Z axis plus direction) along a long side of a light incident surface 16c, which will be described later, of the light guide plate 16. A side wall 20f is integrally configured from another end of the bottom 20b in the Y axis plus direction in the direction in which light is emitted. The side wall 20a has a side surface 20e as an inner side surface. The side wall 20f has a side surface 20g as an inner side surface. The side surface 20e and the side surface 20g are surfaces extending from the respective ends of the floor surface 20d along the direction (the Z axis plus direction) in which light is emitted from the main surface (a light-emitting surface) 16a, which will be described later, of the light guide plate 16. The bottom 20b has a concave portion 20c. The concave portion 20c is formed in a manner concaved from the lower end of the side surface 20e in the Y axis minus direction of the floor surface 20d along the side surface 20e in a direction (the Z axis minus direction) opposite to the direction in which light is emitted, so as to release the lower end of the FPC 12. The concave portion 20c has a concave surface 20d_2. With the first connection member 15 disposed on the plane surface 20d_1, the concave portion 20c has a comparatively small width (the size of the concave portion 20c in the Y axis direction) such that a larger part of the first connection member 15 can be disposed on the plane surface 20d_1.

The light guide plate 16 is formed from a transparent material (such as polycarbonate resin) in a rectangular shape in the top view. The light guide plate 16 has two main surfaces 16a and 16b and a light incident side surface (light incident surface) 16c as a side surface having the LEDs 14 disposed thereon. The light incident surface 16c is an elongated surface extending in the lateral direction (the X axis direction) of the planar illumination device 10. Light emitted from the LEDs 14 enters the light incident surface 16c. The main surface 16a is a light-emitting surface emitting light incident from the light incident surface 16c (light emitted from the LED 14). The "main surface 16a" may therefore be referred to as a "light-emitting surface 16a". The main surface 16b opposite to the light-emitting surface 16a of the light guide plate 16 has, for example, a light path changing pattern configured by a plurality of dots formed thereon. The light path changing pattern changes directions in which light travels in the light guide plate 16, and the light is emitted from the light-emitting surface 16a. In this manner, the light guide plate 16 guides light incident from the light incident surface 16c. More specifically, the light guide plate 16 guides the incident light to the light-emitting surface 16a. The planar illumination device 10 according to the embodiment is an edge-lighting illumination device. As described above, the main surface 16b is a surface opposite to the light-emitting surface 16a, and the "main surface 16b" can therefore be referred to as an "opposite surface 16b". The opposite surface 16b is a main surface of main surfaces 16a and 16b.

The reflection sheet 21 is disposed in the opposite surface 16b side of the light guide plate 16 and reflects light. For example, the reflection sheet 21 reflects light outflowing from the opposite surface 16b and returns the light to the light guide plate 16. An end portion 21a of the reflection sheet 21 in the LED 14 side is fixed to the floor surface 20d (more specifically, to the plane surface 20d_1 of the floor surface 20d) by the first fixing member 22. The reflection sheet 21 is fixed in this manner and disposed between the opposite surface 16b of the light guide plate 16 and the floor surface 20d. The reflection sheet 21 is shrunk and stretched mainly in the longitudinal direction (the Y axis direction) of the planar illumination device with changes in the usage environments (for example, changes in temperature and humidity). When the reflection sheet 21 has the smallest length in the Y-axis direction under possible usage environments, an end 21b of the reflection sheet 21 is preferably positioned closer to the Y axis plus direction side than to an end of the light shielding sheet 31 in the Y axis minus direction side, in the Y axis direction.

Examples of the first fixing member 22 include a double-sided tape in colorless, black, and white, the double-sided tape having two adhesive surfaces. The double-sided tape may be in another color in addition to the above-described colorless, black, and white. The first fixing member 22 has an adhesive surface attached to the end portion 21a of the reflection sheet 21 in the LED 14 side and the other adhesive surface attached to the floor surface 20d (more specifically, to the plane surface 20d_1 of the floor surface 20d). In this manner, the first fixing member 22 fixes the end portion 21a of the reflection sheet 21 in the LED 14 side to the floor surface 20d. The first fixing member 22 further fixes the reflection sheet 21 to the floor surface 20d in a manner having a gap L1 between the end 21b, which is opposite to an end 21c of the reflection sheet 21 in the LED 14 side, and the side surface 20g.

The LED 14 is a point light source. The LED 14 is a pseudo white LED made of a blue LED and a yellow phosphor. The LED 14 is formed in a substantially rectangular parallelepiped shape as a whole and has a luminescent surface 14a and a surface disposed on a mounted surface 12a, which will be described later, of the FPC 12 in the opposite side to the luminescent surface 14a. The LED 14 is a top view LED. In this embodiment, a plurality of LEDs 14 are arranged on the mounted surface 12a at certain intervals along a long side direction (the X axis direction) of the mounted surface 12a. A plurality of LEDs 14 are arranged at certain intervals along a long side direction (the X axis direction) of the light incident surface 16c with the luminescent surfaces 14a of the respective LEDs 14 facing the light incident surface 16c of the light guide plate 16. In this embodiment, in order to reduce the size of the frame in the light incident side (to reduce the non-effective luminescent area less uniform in brightness), a plurality of LEDs 14 are disposed densely (at smaller intervals). A plurality of LEDs 14 emit light toward the light incident surface 16c. In this manner, a plurality of LEDs 14 emit light incident to the light incident surface 16c. The LED 14 may be a side view LED.

The LEDs 14 as point light sources may be replaced by a light source (a linear light source) linearly configured with a plurality of integrated LEDs 14. More specifically, a line light source may be used in which a plurality of LED chips are mounted on an elongated substrate and integrally covered by sealing resin.

The FPC 12 is an elongated substrate extending in the lateral direction (the X axis direction, which is a long side direction of the light incident surface 16c) of the planar illumination device 10. The FPC 12 has two main surfaces 12a and 12b. The two main surfaces 12a and 12b are elongated surfaces extending in the lateral direction of the planar illumination device 10. Of the two main surfaces 12a and 12b, the main surface 12a is a surface on which the LEDs 14 are mounted. In other words, each of surfaces opposite to each of the luminescent surfaces 14a of the LEDs 14 is mounted on the main surface 12a of the two main surfaces 12a and 12b. The "main surface 12a" may be referred to as a "mounted surface 12a". The mounted surface 12a faces a surface opposite to the luminescent surface 14a of the LED 14. A driving circuit (not illustrated) controls the LEDs 14 to drive and light through the FPC 12. The main surface 12b is a surface opposite to the mounted surface 12a.

The second fixing member 13 fixes the FPC 12 to the side surface 20e of the frame 20. The second fixing member 13 is a double-sided tape having two adhesive surfaces. The second fixing member 13 has one of its adhesive surfaces attached to the main surface 12b of the FPC 12 and the other adhesive surface attached to the side surface 20e, whereby the FPC 12 is fixed to the side surface 20e.

The first connection member 15 is disposed between the light guide plate 16 and the floor surface 20d and between the LED 14 and the floor surface 20d, and optically and structurally connects the light guide plate 16 and the LED 14 with each other. More specifically, the first connection member 15 connects the light incident surface 16c of the light guide plate 16 and the luminescent surface 14a of the LED 14 with each other in a state that the optical axis of the light guide plate 16 coincides with the optical axis of the LED 14. The first connection member 15 is an elongated single-sided tape and includes an adhesive layer (adhesive agent) 15a and a base member 15b. The first connection member 15 is an exemplary "connection member" in the present invention.

The base member 15b is made of, for example, polyethyleneterephthalate (PET), and the adhesive layer 15a is made of, for example, silicone or acrylic resin. The adhesive layer 15a adheres to at least a part closer to the LED 14 on the opposite surface 16b of the light guide plate 16 and adheres to at least a part closer to the light guide plate 16 on a surface of the LED 14 in the floor surface 20d side. With this configuration, at least a part of the opposite surface 16b of the light guide plate 16 and at least a part of the surface of the LED 14 in the floor surface 20d side are assembled to the first connection member 15. The first connection member 15 accordingly connects the light incident surface 16c of the light guide plate 16 and the luminescent surface 14a of the LED 14 with each other. For example, even if the LED 14 and the light incident surface 16c of the light guide plate 16 have respective different thicknesses, the LED 14 and the light guide plate 16 can be connected to each other by making the surface of the LED 14 in the floor surface 20d side flush with the opposite surface 16b of the light guide plate 16 flatwise.

If the first connection member 15 is a double-sided tape, the light guide plate 16 and the LED 14 are fixed to the floor surface 20d. Consequently, the light guide plate 16 and the LED 14 cannot release an external force applied to the planar illumination device 10, and are therefore likely to be broken. The first connection member 15 according to the embodiment is, however, a single-sided tape, and the light guide plate 16 and the LED 14 are therefore not fixed to the floor surface 20d. With this configuration, the light guide plate 16 and the LED 14 can release an external force. The planar illumination device 10 according to the embodiment can prevent breakage of the light guide plate 16 and the LED 14.

The first connection member 15 includes a member absorbing light or a member reflecting light. For example, with a member reflecting light, the first connection member 15 reflects light emitted from the luminescent surface 14a of the LED 14 and returns the light to the light guide plate 16, thereby increasing brightness.

The second connection member 17 is disposed opposite to the first connection member 15 with respect to the light guide plate 16 and the LED 14 and optically or structurally connects the light guide plate 16 and the LED 14 with each other. More specifically, the second connection member 17 connects the light incident surface 16c of the light guide plate 16 and the luminescent surface 14a of the LED 14 with each other. The second connection member 17 is disposed between the diffusion sheet 18, which will be described later, and the light guide plate 16, and between the diffusion sheet 18 and the LED 14. The second connection member 17 is, for example, a double-sided tape having two adhesive surfaces. The second connection member 17 has an adhesive surface attached to at least a part closer to the LED 14 on the light-emitting surface 16a of the light guide plate 16 and attached to at least a part closer to the light guide plate 16 on a surface opposite to the surface in the floor surface 20d side of the LED 14. With this configuration, at least a part of the light-emitting surface 16a of the light guide plate 16 and at least a part of the surface opposite to the surface in the floor surface 20d side of the LED 14 are assembled to the second connection member 17. The second connection member 17 accordingly connects the light incident surface 16c of the light guide plate 16 and the luminescent surface 14a of the LED 14 with each other.

The second connection member 17 has the other adhesive surface attached to at least a part of the diffusion sheet 18 in the side wall 20a side. With this configuration, the second connection member 17 fixes the diffusion sheet 18 to the light guide plate 16 and the LED 14. The second connection member 17 in this configuration can prevent the diffusion sheet 18 from being separated above from the light guide plate 16, which can prevent deterioration of the brightness of light emitted from the luminescent area 90 and the brightness characteristics such as the brightness distribution.

The diffusion sheet 18 is disposed in the light incident surface 16a side of the light guide plate 16 and diffuses light emitted from the light-emitting surface 16a. More specifically, the diffusion sheet 18 is disposed in a manner covering the light-emitting surface 16a and at least a part of a surface opposite to the floor surface 20d side of the LED 14 and diffuses light emitted from the light-emitting surface 16a. As described above, the diffusion sheet 18 is fixed to the light guide plate 16 and the LED 14 by the second connection member 17.

The prism sheet 19 is disposed on a surface opposite to the surface facing the light-emitting surface 16a of the diffusion sheet 18, controls distribution of light diffused by the diffusion sheet 18, and emits the light distribution of which has been controlled.

The light shielding sheet 30 is disposed in a manner covering the prism sheet 19 in the side wall 20a side and shields light emitted from an area on the light-emitting surface 16a of the light guide plate 16.

The light shielding sheet 30 includes a first light shielding sheet 30a and a second light shielding sheet 30b. The first light shielding sheet 30a is, for example, a single-sided tape capable of shielding light and having an adhesive surface. The first light shielding sheet 30a has an end of the adhesive surface attached to an outer surface of the side wall 20a of the frame 20 and has the other end of the adhesive surface attached to the prism sheet 19 in the side wall 20a side. The second light shielding sheet 30b is, for example, a double-sided tape capable of shielding light and having two adhesive surfaces. One of the two adhesive surfaces of the second light shielding sheet 30b is attached to a surface opposite to the adhesive surface of the first light shielding sheet 30a. The other adhesive surface of the second light shielding sheet 30b is attached to a liquid crystal display device using the planar illumination device 10 as a backlight.

The light shielding sheet 31 is disposed in a manner covering the prism sheet 19 in the side wall 20f side and shields light emitted from an area on the light-emitting surface 16a of the light guide plate 16.

The light shielding sheet 31 includes the third light shielding sheet 31a and the fourth light shielding sheet 31b. The third light shielding sheet 31a is, for example, a single-sided tape capable of shielding light and having an adhesive surface. The third light shielding sheet 31a has an end of the adhesive surface attached to an outer surface of the side wall 20f of the frame 20 and has the other end of the adhesive surface attached to the prism sheet 19 in the side wall 20f side. The fourth light shielding sheet 31b is, for example, a double-sided tape capable of shielding light and having two adhesive surfaces. One of the two adhesive surfaces of the fourth light shielding sheet 31b is attached to a surface opposite to the adhesive surface of the third light shielding sheet 31a. The other adhesive surface of the fourth light shielding sheet 31b is attached to the liquid crystal display device using the planar illumination device 10 as a backlight.

Figure 3:
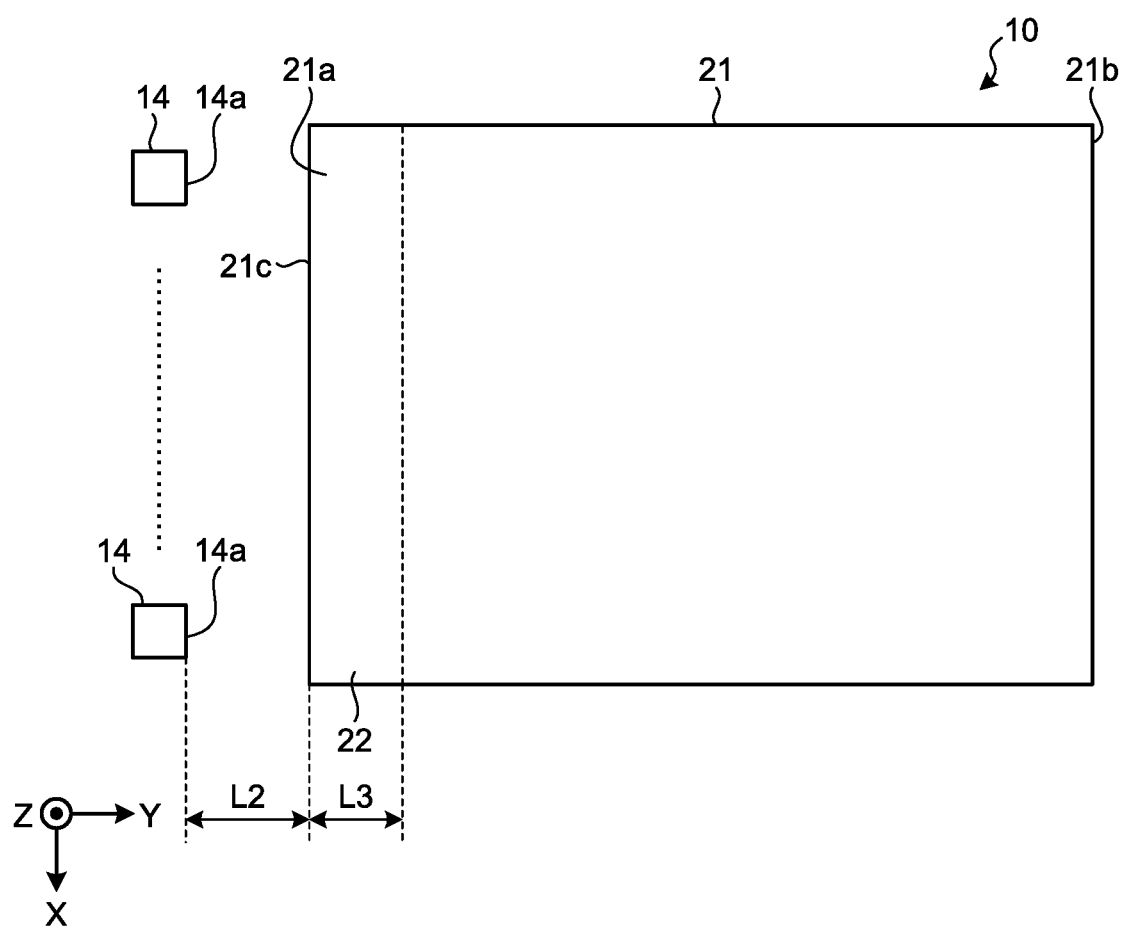
FIG. 3 is a drawing that illustrates exemplary positional relation between LEDs, a reflection sheet, and a fixing member.

FIG. 3 is a drawing that illustrates exemplary positional relation between LEDs, a reflection sheet, and a fixing member. FIG. 3 is a top view of the LEDs 14, the reflection sheet 21, and the first fixing member 22.

As illustrated in the example of FIG. 3, one of the two adhesive surfaces of the first fixing member 22, which is a double-sided tape, is attached from an end to the other end in the X axis direction of the end portion 21a in the LED 14 side of the reflection sheet 21. In other words, the first fixing member 22 has one of the adhesive surfaces attached to the whole of the end portion 21a of the reflection sheet 21 in the LED 14 side. The end portion 21a is a portion of the reflection sheet 21 and, more specifically, a portion from an end 21c in the LED 14 side to a position ahead of the end 21c by a distance L3 in the Y axis plus direction, of the reflection sheet 21.

As illustrated in FIG. 2, the other adhesive surface of the first fixing member 22 is attached to the floor surface 20d. With this configuration, the first fixing member 22 fixes an end to the other end in the X axis direction of the end portion 21a of the reflection sheet 21 to the floor surface 20d. In other words, the first fixing member 22 fixes the whole of the end portion 21a of the reflection sheet 21 in the LED 14 side to the floor surface 20d. As described above with reference to FIG. 2, the first fixing member 22 fixes the reflection sheet 21 to the floor surface 20d in a manner having the gap L1 between the end 21b, which is opposite to the end 21c of the reflection sheet 21 in the LED 14 side, and the side surface 20g. In this embodiment, the position of the reflection sheet 21 is fixed in a manner forming the gap L1 between the end 21b of the reflection sheet 21 and the side surface 20g even when the reflection sheet 21 is stretched in the Y axis plus direction with possible changes in the usage environments (for example, changes in temperature and humidity) of the planar illumination device 10. With this configuration, the end 21b of the reflection sheet 21 will not contact the side surface 20g even when the reflection sheet 21 is stretched in the Y axis plus direction.

As described above, in the planar illumination device 10 according to the embodiment, the reflection sheet 21 has not all the end portions (not all the sides) fixed to the floor surface 20d but has only the end portion 21a in the LED 14 side fixed to the floor surface 20d. With this configuration, the reflection sheet 21 can shrink in the Y axis minus direction without generating wrinkles due to changes in the usage environments. With the planar illumination device 10 according to the embodiment, the occurrence of non-uniform brightness can be prevented on the light-emitting surface 16a of the light guide plate 16. Consequently, with the planar illumination device 10 according to the embodiment, deterioration of the brightness distribution on the light-emitting surface 16a of the light guide plate 16 can be prevented.

In the planar illumination device 10 according to the embodiment, the above-described gap L1 is formed with only the end portion 21a of the reflection sheet 21 in the LED 14 side fixed to the floor surface 20d. As described above, with this configuration of the planar illumination device 10 according to the embodiment, the end 21b of the reflection sheet 21 will not contact the side surface 20g even when the reflection sheet 21 is stretched in the Y axis plus direction. The reflection sheet 21 can be stretched in the Y axis plus direction without generating wrinkles due to changes in the usage environments. With this configuration of the planar illumination device 10 according to the embodiment, the occurrence of non-uniform brightness can be prevented on the light-emitting surface 16a of the light guide plate 16, thereby preventing deterioration of the brightness distribution on the light-emitting surface 16a of the light guide plate 16. Furthermore, by restricting a side of the reflection sheet 21 stretching in the lateral direction (the X axis direction), less distortion is caused by the restriction compared with the case of restricting a side of the reflection sheet 21 stretching in the longitudinal direction (the Y axis direction).

In the planar illumination device 10 of the embodiment, a distance L2 (see FIG. 3) between the luminescent surface 14a of the LED 14 and the end portion 21a of the reflection sheet 21 is determined to a certain value so as not to cause non-uniform brightness on the light-emitting surface 16a of the light guide plate 16. A change in the value of the distance L2 from the certain value changes positional relation between the luminescent surface 14a and the end portion 21a of the reflection sheet 21 and changes positional relation between members, which includes positional relation between the end portion 21a of the reflection sheet 21 and the light guide plate 16, disposed on the light guide plate 16 in the light incident side. The change in the value of the distance L2 from the certain value may cause non-uniform brightness and thus may cause deterioration of the optical characteristics such as the brightness distribution. In this embodiment, the planar illumination device 10 is configured such that the size of the frame in the light incident side is reduced. With this configuration, a change in positional relation between members in the light incident side significantly affects changes and deterioration in the optical characteristics. However, the planar illumination device 10 according to the embodiment has the end portion 21a of the reflection sheet 21 in the LED 14 side fixed to the floor surface 20d. In the planar illumination device 10 according to the embodiment, the value of the distance L2 between the luminescent surface 14a of the LED 14 and the end portion 21a of the reflection sheet 21 does not change with changes in the usage environments, and is kept to a certain value determined to prevent the occurrence of non-uniform brightness. As described above, the planar illumination device 10 according to the embodiment has no changes in positional relation between members disposed in the light incident side of the light guide plate 16. With this configuration of the planar illumination device 10 according to the embodiment, the occurrence of non-uniform brightness can be prevented on the light-emitting surface 16a of the light guide plate 16 in the light incident side, which can accordingly prevent deterioration of the brightness distribution on the light-emitting surface 16a of the light guide plate 16 in the light incident side. In other words, this configuration can reduce the size of the frame in the light incident side without deteriorating the brightness distribution.

The planar illumination device 10 according to the embodiment has been described. As described above, the planar illumination device 10 according to the embodiment can prevent deterioration of the brightness distribution.

First modification and second modification of the embodiment

In the above-described embodiment, the first fixing member 22 fixes the whole of the end portion 21a of the reflection sheet 21 in the LED 14 side to the floor surface 20d. In another configuration, a fixing member may fix a part of the end portion 21a of the reflection sheet 21 in the LED 14 side to the floor surface 20d. Two modifications, a first modification and a second modification of the embodiment, will now be described in which a fixing member fixes a part of the end portion 21a of the reflection sheet 21 in the LED 14 side to the floor surface 20d. In the first modification and the second modification, like numerals indicate like components in the above-described embodiment, and detailed description may be omitted.

Figure 4:
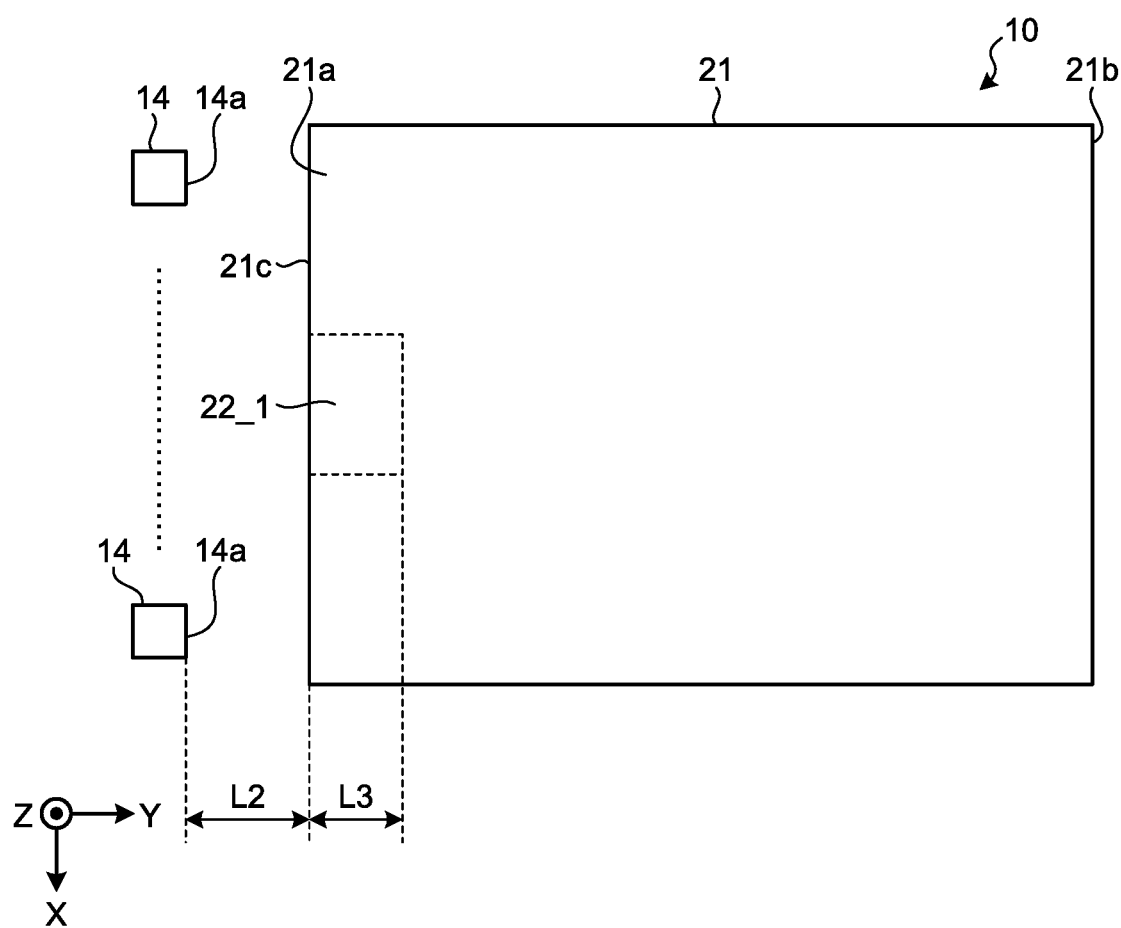
FIG. 4 is a drawing illustrating a planar illumination device according to a first modification of the embodiment.
Figure 5:
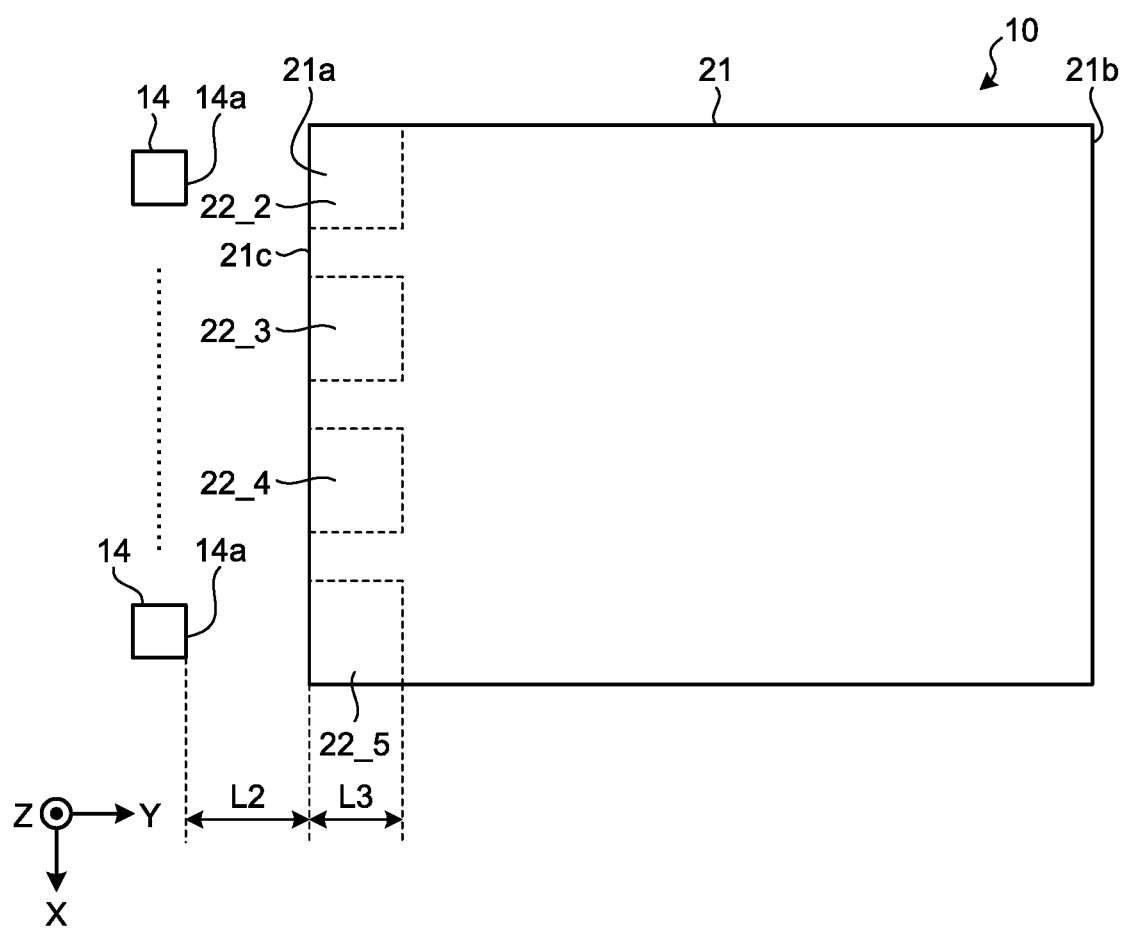
FIG. 5 is a drawing illustrating a planar illumination device according to a second modification of the embodiment.

FIG. 4 is a drawing illustrating a planar illumination device according to a first modification of the embodiment, and FIG. 5 is a drawing illustrating a planar illumination device according to a second modification of the embodiment.

In the planar illumination device 10 according to the first modification, one of two adhesive surfaces of a first fixing member 22_1, which is a double-sided tape, may be attached to a part of the end portion 21a of the reflection sheet 21 in the LED 14 side. For example, as illustrated in FIG. 4, one of the adhesive surfaces of the first fixing member 22_1 may be attached to a center portion in the X axis direction of the end portion 21a of the reflection sheet 21 in the LED 14 side. In this case, the other adhesive surface of the first fixing member 22_1 is attached to the floor surface 20d (see FIG. 2) as is the case of the above-described embodiment. With this configuration, the first fixing member 22_1 fixes a part of the end portion 21a of the reflection sheet 21 in the LED 14 side to the floor surface 20d.

In the planar illumination device 10 according to the second modification, four adhesive surfaces (one of two adhesive surfaces of each of first fixing members 22_2 to 22_5) of the respective first fixing members 22_2 to 22_5, which are four (a plurality of) double-sided tapes, may be discretely attached to the end portion 21a in the X axis direction of the reflection sheet 21 in the LED 14 side as illustrated in FIG. 5. In this case, other four adhesive surfaces (the other adhesive surface of two adhesive surfaces of each of the first fixing members 22_2 to 22_5) of the first fixing members 22_2 to 22_5 are attached to the floor surface 20d (see FIG. 2) as is the case of the above-described embodiment. With this configuration, the first fixing members 22_2 to 22_5 fix respective parts of the end portion 21a of the reflection sheet 21 in the LED 14 side to the floor surface 20d.

In the embodiment, the first fixing member 22 fixes the whole of the end portion 21a of the reflection sheet 21 in the LED 14 side to the floor surface 20d. In the first modification and the second modification, the first fixing member 22 fixes a part of the end portion 21a of the reflection sheet 21 in the LED 14 side to the floor surface 20d. In the planar illumination device 10, the first fixing member 22 only needs to fix at least a part of the end portion 21a of the reflection sheet 21 in the LED 14 side to the floor surface 20d. Fixing (restricting) a part of the reflection sheet 21 can further reduce the amount of distortion caused due to the restriction, which can obtain more uniform brightness.

According to an embodiment of the present invention, deterioration of brightness distribution can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination device, comprising:
a light guide plate that guides an incident light from a side surface;
a light source that is disposed in the side surface side of the light guide plate and emits light incident to the side surface of the light guide plate;
a frame that has a floor surface extending along a main surface of the light guide plate and accommodates the light guide plate and the light source;
a reflection sheet that is disposed in the main surface side of the light guide plate and reflects light, the reflection sheet having a first edge closer to the light source and a second edge opposing to the first edge; and
a first fixing member that is disposed between the reflection sheet and the floor surface and fixes only the first edge of two of the edges of the reflection sheet to the floor surface so as to maintain the second edge extendable and contractible, with respect to the frame and the light guide plate, along the longitudinal direction of the planar illumination device, and
another member that is disposed between the light guide plate and the floor surface, and between the light source and the floor surface, wherein
the first fixing member fixes the reflection sheet to the floor surface at a position shifted away from the side surface of the light guide plate so that the first edge of the reflection sheet is located a distance away from the side surface of the light guide plate and has a surface facing the light guide plate that is coplanar with the another member, the first fixing member fixing the reflection sheet to the floor surface in a manner having a gap with a predetermined distance between the first edge and an edge of the another member.

2. The planar illumination device according to claim 1, wherein a whole part, along the lateral direction of the planar illumination device, of the first edge of the reflection sheet is fixed by the first fixing member to the floor surface.

3. The planar illumination device according to claim 1, wherein at least one part, along the lateral direction of the planar illumination device, of the first edge of the reflection sheet is fixed by the first fixing member to the floor surface.

4. The planar illumination device according to claim 1, wherein
the frame further has a first side surface closer to the light source and second side surface opposing to the first side surface, the first side surface and the second side surface extending from an end portion of the floor surface along a direction in which the light is emitted from the main surface; and
the first fixing member fixes the reflection sheet to the floor surface in a manner having a gap between the second edge and the second side surface of the frame.

5. The planar illumination device according to claim 4, wherein the light source has a luminescent surface emitting light incident to the side surface of the light guide plate, the planar illumination device further comprising:
a substrate that has two main surfaces, a surface opposite to the luminescent surface of the light source being mounted on one of the main surfaces; and wherein
a first connection member is disposed as the another member between the light guide plate and the floor surface, and between the light source and the floor surface, the first connection member connecting the light guide plate and the light source with each other.

6. The planar illumination device according to claim 5, wherein
the light guide plate guides light incident from the side surface of the light guide plate to a light-emitting surface and emits the light from the light-emitting surface; and
at least a part of a surface opposite to the light-emitting surface of the light guide plate and at least a part of a surface of the light source in the floor surface side are assembled to the first connection member.

7. The planar illumination device according to claim 5, further comprising:
a second fixing member that fixes the substrate to the other side surface in the light source side among the side surfaces of the frame.

8. The planar illumination device according to claim 7, wherein the first connection member is a single-sided tape, and the second fixing member is a double-sided tape.

9. The planar illumination device according to claim 1, wherein the first fixing member fixes the reflection sheet to the floor surface such that the first edge of the reflection sheet is substantially aligned with an edge of the first fixing member.

10. The planar illumination device according to claim 1, wherein the light guide plate has a plurality of side surfaces, and the light source is disposed only in one side surface of the side surfaces of the light guide plate.

11. The planar illumination device according to claim 4, wherein the gap is disposed out of a luminescent area in a top view.

12. The planar illumination device according to claim 1, wherein the first edge that fixes the reflection sheet to the floor surface is arranged at a position shifted away from the side surface side of the light guide plate to the side opposite to the light source.

13. The planar illumination device according to claim 1, wherein the first fixing member fixes the reflection sheet to the floor surface in a manner having a gap with a predetermined distance between the first edge and an edge of a first connection member connecting the light guide plate and the light source with each other.

14. The planar illumination device according to claim 1, wherein the gap is disposed out of a luminescent area in a top view.

15. A planar illumination device, comprising:
a light guide plate, and
another member that is disposed between the light guide plate and the floor surface, and between the light source and the floor surface, wherein that guides an incident light from a side surface;
a light source that is disposed in the side surface side of the light guide plate and emits light incident to the side surface of the light guide plate;
a frame that has a floor surface extending along a main surface of the light guide plate and accommodates the light guide plate and the light source;
a reflection sheet that is disposed in the main surface side of the light guide plate and reflects light, the reflection sheet having a first edge closer to the light source and a second edge opposing to the first edge; and
a first fixing member that is disposed between the reflection sheet and the floor surface and fixes only the first edge of two of the edges of the reflection sheet to the floor surface, wherein the second edge is not fixed to either of the frame and the light guide plate.

* * * * *